United States Patent

[11] 3,568,100

[72] Inventor Richard A. Tarbos
North Andover, Mass.
[21] Appl. No. 693,452
[22] Filed Dec. 26, 1967
[45] Patented Mar. 2, 1971
[73] Assignee Bell Telephone Laboratories, Incorporated
Murray Hill, Berkely Heights, N.J.

[54] AUTOMATIC EQUALIZER FOR DIGITAL TRANSMISSION SYSTEMS
7 Claims, 7 Drawing Figs.

[52] U.S. Cl. .......... 333/18, 330/29, 330/145, 333/28
[51] Int. Cl. .......... H04b 3/04
[50] Field of Search .......... 333/18, 28; 330/144, 145, 29; 178/70; 179/170.8

[56] References Cited
UNITED STATES PATENTS

| | | | |
|---|---|---|---|
| 3,141,137 | 7/1964 | Greutman .......... | 330/145X |
| 3,423,535 | 1/1969 | Hochgraf et al. .......... | 333/18X |
| 3,213,196 | 10/1965 | Tuck et al. .......... | 333/18X |
| 3,483,335 | 12/1969 | Piotrowski .......... | 179/170.8X |

*Primary Examiner*—Paul L. Gensler
*Attorneys*—R. J. Guenther and E. W. Adams, Jr.

ABSTRACT: An automatic equalizer for digital transmission systems includes a variable equalizing network having a transfer characteristic with substantially flat loss, a fixed pole, and a variable zero, an amplifier connected to receive the output from the equalizing network and having substantially flat gain and a fixed zero substantially coincident in frequency with and canceling the fixed pole of the equalizing network, and a peak detector connected to receive the output from the amplifier and control both the flat loss and the frequency of the variable zero of the equalizing network.

INVENTOR
R. A. TARBOX
BY R. B. Ardis
ATTORNEY

AUTOMATIC EQUALIZER FOR DIGITAL TRANSMISSION SYSTEMS

BACKGROUND OF THE INVENTION

This invention relates generally to digital transmission systems and, more particularly, to arrangements for equalizing the transfer characteristics of such systems for differing lengths and gauges of cable.

In one of the most important types of digital transmission system, pulses of substantially uniform amplitude and duration are transmitted between terminal facilities by way of regenerative repeaters spaced at intervals along the transmission medium. At each repeater point, apparatus first distinguishes during each digit space between the presence of absence of a pulse and then regenerates each detected pulse with substantially its original amplitude and duration. Because of the frequency dependent nature of the cable transfer characteristic, it is necessary to provide equalization for the preceding section of cable at each repeater point. Ideally, repeater spacing and cable gauges should be uniform in order to yield substantially the same equalization requirements at each repeater. Completely uniform repeater spacings are seldom achieved in practice, however and it is not always feasible to employ only a single cable gauge. As a result, it is usually necessary to employ additional networks to build each section of cable out to a standard electrical length in order to standardize the equalization requirements. When a digital transmission system of this type is installed, it is necessary, therefore, first to make tests to measure the electrical length of each section of cable and then to select the proper build-out network from a relatively large number of such networks for building it out to a standard electrical length. Although effective, such procedures are undesirable in their requirements for field testing and maintaining a large enough inventory of line build-out networks to meet all conditions which are likely to be encountered.

An object of the invention is to provide equalization at each repeater point in a digital transmission system without any necessity for field testing or using specially selected line build-out networks.

Another and more particular object is to provide automatic equalization at each repeater point in such a system for differing lengths and gauges of cable.

SUMMARY OF THE INVENTION

The transfer characteristic of a length of cable connecting adjacent regenerator repeaters in a digital transmission system can be approximated by the combination of flat loss and a single attenuation pole. The magnitude of the flat loss and the frequency of the pole are both dependent upon the length and the guage of the cable. For a given gauge of cable, the flat loss increases with length and the frequency of the pole decreases. For a given length of cable, the flat loss increases and the frequency of the pole decreases as the cable gauge becomes finer.

In accordance with the invention, a digital transmission system is equalized automatically at repeater points by an equalization circuit connected to receive incoming pulses and having a transfer characteristic with substantially flat gain and at least one variable zero, a peak detector connected to generate an output proportional to the peak amplitude of the equalizing circuit output, and an arrangement for varying both the magnitude of the flat gain and the frequency of the variable zero of the equalizing circuit under the control of the peak detector. Because the originally transmitted pulses are of substantially uniform amplitude and duration, the received equalized peak signal amplitude is a measure not only of the flat loss of the preceding section of cable but also of the frequency response. The invention thus provides automatic equalization by increasing flat gain and reducing the frequency of the zero if the received peak signal amplitude is high.

In accordance with a particular feature of the invention, the adjustable equalizing circuit may be realized advantageously by a passive equalizing network connected to receive the incoming pulses and having a transfer characteristic with substantially flat loss, a fixed pole, and at least one variable zero and an amplifier connected to receive the output of the equalizing network and having a transfer characteristic with substantially flat gain and a fixed zero substantially coinciding in frequency with and canceling the fixed pole of the passive equalizing network. The frequency of the variable zero is then, in accordance with the invention, adjusted under the control of the peak detector. The resulting circuit is simple and relatively easy to realize in integrated circuit form.

DETAILED DESCRIPTION

Figure 1:
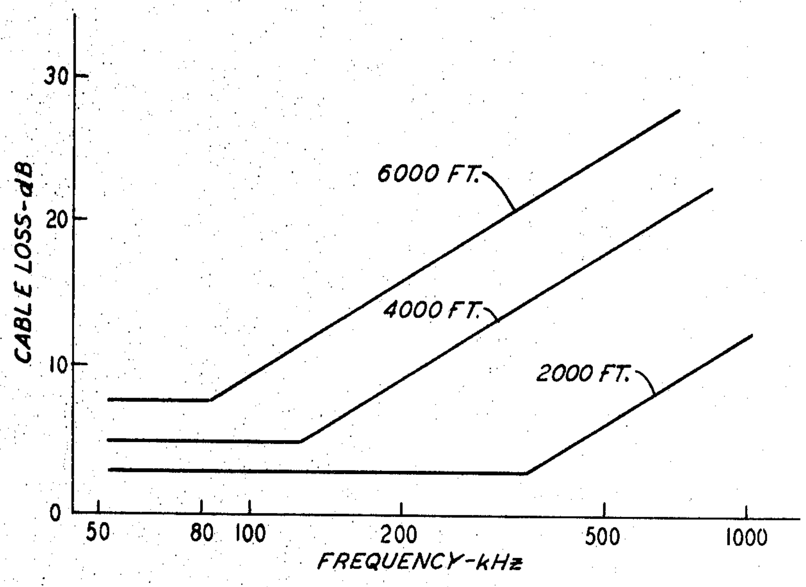
FIG. 1 illustrates straight line approximations of the transfer characteristics for several different lengths of cable connecting adjacent regenerative repeaters in a digital transmission system.

The curves of cable loss versus frequency shown in FIG. 1 are straight line approximations of the transfer characteristics for 6,000, 4,000, and 2,000-foot lengths of 22 gauge cable. As shown, each characteristic is approximated by flat loss and a single attenuation pole. For 6,000 feet of cable the pole appears at 80 kHz, for 4,000 feet of cable it appears at 120 kHz, and for 2,000 feet of cable it appears at 330 kHz. As shown, the flat loss increases with cable length and the frequency of the pole decreases. The transfer characteristics are similar for different gauges of cable except that for the same length of cable the flat loss is greater and the frequency of the attenuation pole lower for finer cable gauges.

In a digital transmission system such as the Bell System's T1 carrier system (the repeaters of which are described in the article "A Bipolar Repeater for Pulse Code Signals" by J. S. Mayo, appearing at page 25 in the Jan. 1962 issue of the Bell System Technical Journal), the repeaters are normally spaced at maximum of 6,000 feet apart. In the past, the input side of each repeater has been provided with an equalizer that compensated for 6,000 feet of cable and cable sections shorter than that have been built out to an electrical length equivalent to 6,000 feet by properly selected line build-out networks. The proper build-out network was selected after field testing showed the actual electrical length of the cable section.

Figure 2:
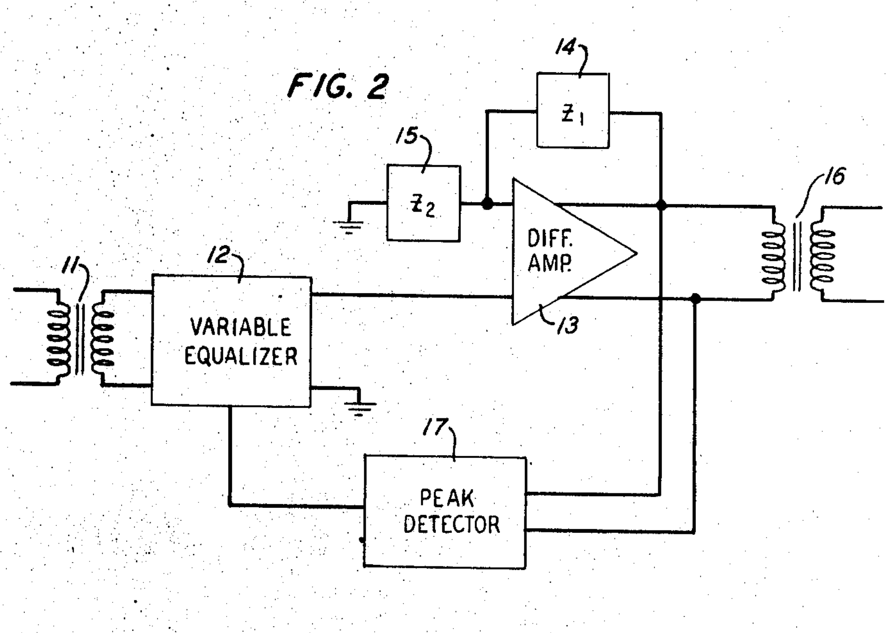
FIG. 2 is a block diagram of an automatic equalizer embodying the invention.

In the embodiment of the invention illustrated in block diagram form in FIG. 2, the output end of the section of line to be equalized is connected through a transformer 11 to the input side of a passive variable equalizing network 12. The output of equalizing network 12 is connected to one input of a differential amplifier 13 which has, as shown, an unbalanced input and a balanced output. Differential amplifier 13 is provided with negative feedback to shape its frequency response by a series impedance 14 and a shunt impedance 15, and its output is connected to the regenerative repeater through circuitry which may, for example, include a transformer 16. Both sides of the output of the differential amplifier 13 are connected to a peak detector 17 which controls variable equalizing network 12.

Figure 3:
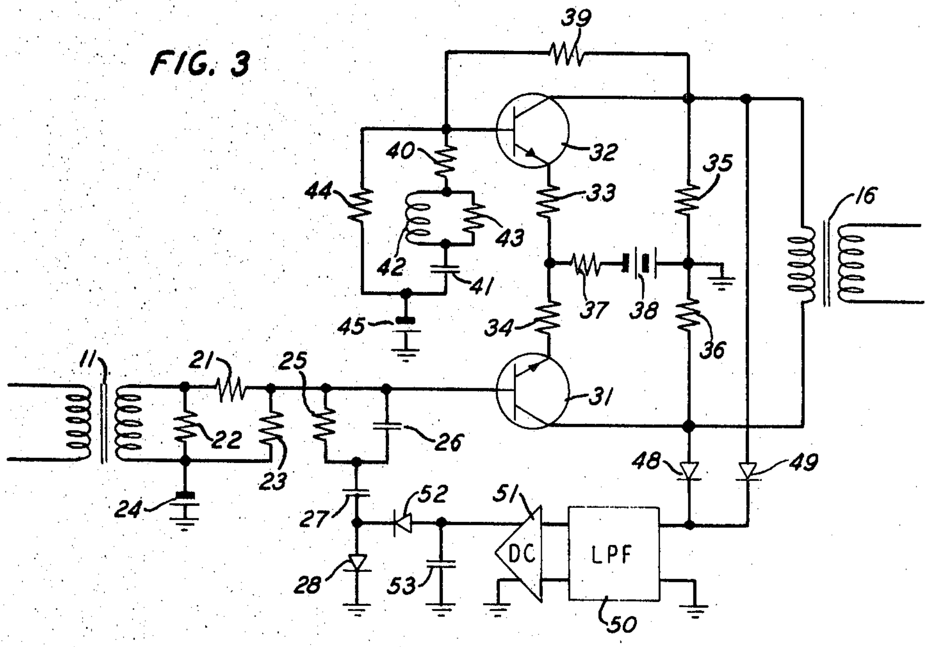
FIG. 3 is a more detailed diagram of the embodiment of the invention shown in FIG. 2.

A more detailed diagram of the embodiment of the invention shown in FIG. 2 appears in FIG. 3. As shown in FIG. 3, the output winding of transformer 11 is connected to resistance pad made up of a series resistor 21 and a pair of shunt resistors 22 and 23. The common point of the output winding and resistors 22 and 23 is returned to a negative biasing voltage source 24, and the output end of resistor 21 is connected to the input of the differential feedback amplifier, shown in FIG. 3 as the base electrode of an NPN transistor 31.

The variable equalizing network in FIG. 3 is particularly easy to realize in integrated circuit form and is formed by the resistance looking back toward the resistance pad, by a resistor 25 and a capacitor 26 connected in parallel between the base electrode of transistor 31 and a DC blocking capacitor 27, and by a pair of semiconductor diodes 28 and 52 connected in parallel with respect to AC between blocking capacitor 27 and ground. As shown, diode 28 is connected directly from capacitor 27 to one side of an AC bypass capacitor 53. The other side of capacitor 53 is grounded. Diode 28 is poled for easy current flow toward ground, while diode 52 is poled for easy current flow toward the junction between capacitor 27 and diode 28. Together, diodes 28 and 52 function as a current-sensitive variable resistance.

The differential amplifier in the embodiment of the invention illustrated in FIG. 3 is also particularly easy to realize in integrated circuit form and is shown for simplicity as a single stage amplifier using only two NPN transistors 31 and 32. Additional stages may of course be employed as desired and transformer 16 may be eliminated if it is desired to employ integrated circuit techniques. As shown in FIG. 3, the emitters of transistors 31 and 32 are joined through a pair of biasing resistors 33 and 34, and their collectors are joined through a pair of voltage dropping resistors 35 and 36. The common point between resistors 35 and 36 is grounded and that between resistors 33 and 34 is returned through a resistor 37 to a negative biasing voltage source 38. As shown, the voltage provided by source 38 is greater than that provided by source 24. The input winding of transformer 16 is connected between the collector electrodes of transistors 31 and 32.

The frequency response of the differential amplifier is determined principally by the feedback around transistor 32. A resistor 39, equivalent to impedance 14 in FIG. 2, is connected between the collector and base electrodes of transistor 32. A more complex impedance, equivalent to impedance 15 in FIG. 2 and made up of two parallel branches, is connected between the base of transistor 32 and a negative biasing voltage source 45. One branch of the complex impedance includes a resistor 40 and a capacitor 41 in series with the parallel combination of an inductor 42 and a resistor 43. The other branch is a simple resistor 44. As shown, the voltage provided by source 45 is less than that provided by source 38.

The peak detector in the embodiment of the invention illustrated in FIG. 3 includes a pair of diodes 48 and 49, each connected from the collectors of respective ones of transistors 31 and 32 to the input of a low-pass filter 50. Both diodes are poled for easy current flow toward the filter. The output of filter 50 is, in turn, connected through a DC amplifier 51 to the junction between bypass capacitor 53 and the diode 52 in the variable equalizing network.

In operation, the embodiment of the invention illustrated in FIG. 3 functions to hold constant the peak value of the output signal from the differential amplifier. The feedback path of the differential amplifier provides the necessary equalization for 6,000 feet of 22 gauge cable. With 6,000 feet of cable connected to the input winding of transformer 11, the transfer characteristic of the variable equalizing network is resistive and all of the cable equalization is accomplished by the feedback amplifier. As will be explained later, the transfer characteristic of the feedback amplifier is approximated by flat gain and a fixed zero. For shorter lengths of cable, the illustrated circuit functions both to change the flat loss of the variable equalizing network and, in effect, to change the frequency of the zero in the composite transfer characteristic of the equalizing network and the feedback amplifier.

Figure 4:
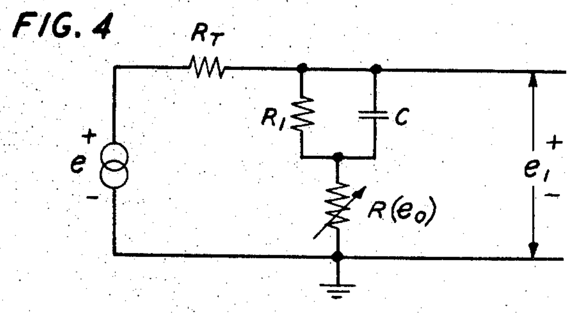
FIG. 4 is an equivalent circuit of the passive equalizing network employed in the embodiment of the invention shown in FIG. 3.

FIG. 4 is an equivalent circuit of the variable equalizing network. As shown, it contains a series resistance $R_T$ representing the resistance contribution of the input resistance pad and a shunt path consisting of a variable resistance $R(e\,O)$ in series with the parallel combination of a resistance $R_1$ and a capacity $C$. $R(e_o)$ represents the forward resistance of parallel diodes 28 and 52 in FIG. 3, $R_1$ represents the resistance of resistor 25, and $C$ represents the capacity of capacitor 26. $R(e_o)$ is controlled by the peak voltage $e_0$ out of the feedback amplifier.

In the analysis of FIG. 4 which follows, it is assumed for simplicity that the input impedance of the feedback amplifier is sufficiently high not to load the variable equalizing network and that the input transformer of the variable equalizing network is ideal. The transfer ratio $e_1/e$ of the network is $$\frac{e_1}{e}=\frac{R(e_0)\left[s+\frac{R(e_0)+R_1}{R(e_0)R_1C}\right]}{[R_T+R(e_0)]\left[s+\frac{R_T+R(e_0)+R_1}{R_1C[R_T+R(e_0)]}\right]} \quad (1)$$

where $s$ is equal to $-2\pi$ times frequency. If $R_1$ is chosen so that $$R_1 << R_T+R(e_0), \quad (2)$$

then $$\frac{e_1}{e}\approx\frac{R(e_0)\left[s+\frac{R(e_0)+R_1}{R(e_0)R_1C}\right]}{[R_T+R(e_0)]\left[s+\frac{1}{R_1C}\right]} \quad (3)$$

By inspection of equation (3), it can readily be seen that the transfer characteristic of the equalizer network has a fixed pole at $$s\approx-\frac{1}{R_1C} \quad (4)$$

an adjustable zero at $$s=-\frac{R(e_0)+R_1}{R(e_0)R_1C} \quad (5)$$

and a flat loss that varies as $$\frac{R(e_0)+R_1}{R_T+R(e_0)} \quad (6)$$

In the illustrated embodiment of the invention, the pole of the equalizing network is placed at $$s=-2\pi(80\text{ kHz}). \quad (7)$$

The operation of the variable equalizing network can best be explained as follows. For 6,000 feet of cable, $R(e_0)$ is much larger than $R_1$, resulting in the cancellation of the pole-zero pair in the variable equalizing network is then set to produce the proper size of peak signal at the output of the feedback amplifier. For shorter lengths of cable, $R(e_0)$ becomes smaller, resulting in the separation of the pole-zero pair. The fixed pole at 80 kHz in the variable equalizing network is used to cancel the zero contained in the feedback amplifier. The zero in the equalizing network is moved to a higher frequency to compensate for the shorter length of cable and the flat loss is adjusted accordingly.

Figure 5:
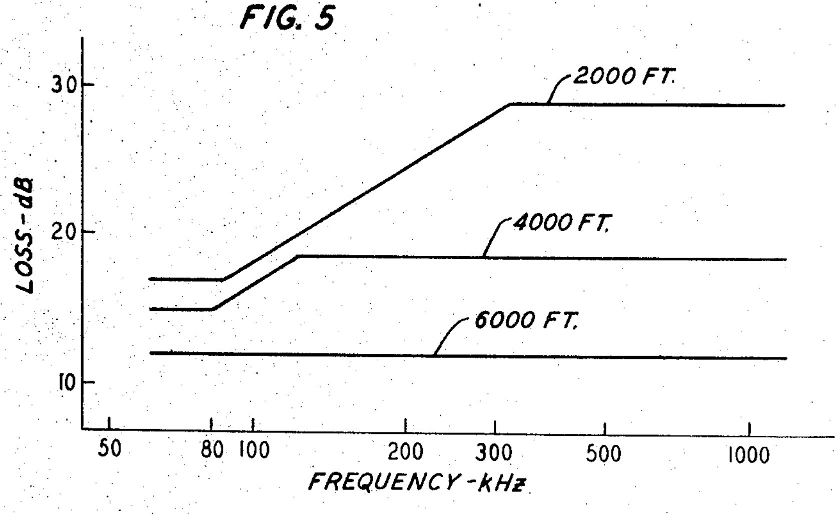
FIG. 5 shows straight line approximations of the transfer characteristics for several different settings of the passive equalizing network shown in FIGS. 3 and 4.

Straight line approximations of the transfer characteristics of the variable equalizing network of FIGS. 3 and 4 are shown in FIG. 5 for 6,000, 4,000, and 2,000 -foot lengths of cable. As shown, for a 6,000 -foot length of cable, the peak output from the differential amplifier provides a minimum forward bias on equalizing network diodes 28 and 52 and the variable zero of the network is substantially coincident in frequency with and cancels the fixed pole. For 6,000 feet of cable, therefore, the variable equalizing network has a flat loss across the spectrum. For a 4,000-foot length of cable, on the other hand, the greater peak output from the differential amplifier provides a larger forward bias on equalizing network diodes 28 and 52. The diode resistances are smaller, causing the flat loss of the equalizing network to increase and the variable zero to move up to approximately 120 kHz. The fixed pole of the equalizing network remains at 80 kHz. Finally, for a 2,000 -foot length of cable, the still greater peak output from the differential amplifier produces a still larger bias on diodes 28 and 52 and their resistances are even smaller. The flat loss of the equalizing network increases still further and the variable zero moves up in frequency to approximately 330 kHz.

Figure 6:
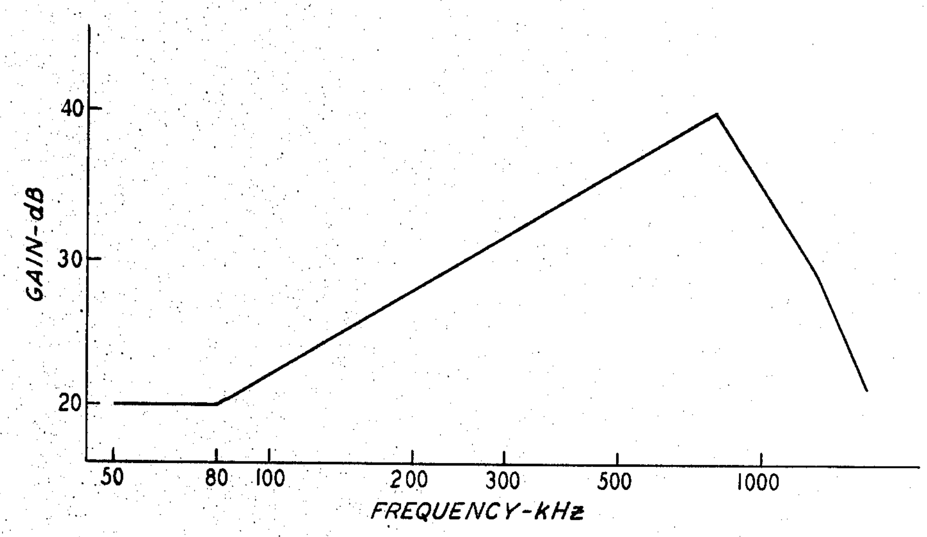
FIG. 6 shows a straight line approximation of the transfer characteristic of the amplifier receiving the output from the passive equalizing network shown in FIGS. 3 and 4.

A straight line approximation of the transfer characteristic of the differential amplifier in the embodiments of the invention illustrated in FIGS. 2 and 3 is shown in FIG. 6. As shown, the gain is flat up to approximately 80 kHz, where the fixed zero occurs. A roll-off occurs above approximately 800 kHz.

Figure 7:
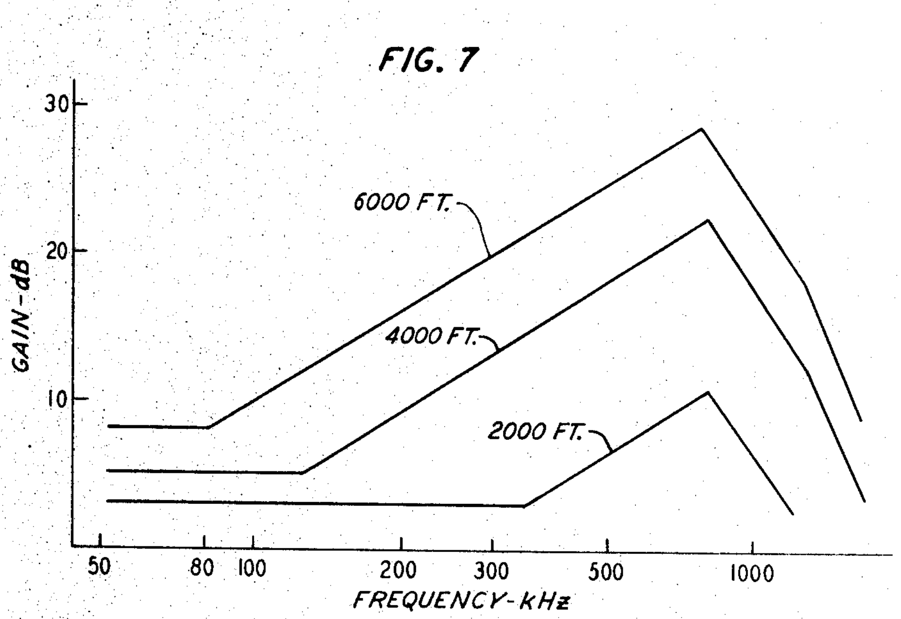
FIG. 7 illustrates straight line approximations of the characteristics for the combination of amplifier and passive equalizing network for several different settings of the latter.

Finally, FIG. 7 shows straight line approximations of the composite transfer characteristics for the combination of the equalizing network and the differential amplifier for 6,000, 4,000, and 2,000-foot lengths of cable. For 6,000 feet of cable the combined characteristic has flat gain and a zero at 80 kHz. for 4,000 feet of cable it has flat gain and a zero at 120 kHz, and for 2,000 feet of cable it has flat gain and a zero at approximately 330 kHz. The roll-off characteristic of the combination is, as shown, controlled by the roll-off characteristic of the differential amplifier. For the different lengths of cable the effect is, in accordance with the invention, one of flat gain and a single variable zero with both the magnitude of the flat gain and the frequency of the variable zero under the control of the peak signal output of the feedback amplifier.

It is to be understood that the above-described arrangements are illustrative of the application of the principles of the invention. Numerous other arrangements may be devised by those skilled in the art without departing from the spirit and scope of the invention.

I claim:

1. An automatic equalizer for a digital transmission system which comprises an equalizing circuit connected to receive incoming pulses and having a transfer characteristic with substantially flat gain and at least one variable zero, a peak detector connected to generate an output proportional to the peak amplitude of the output of said equalizing circuit, and means to vary both the magnitude of the flat gain and the frequency of the variable zero of said equalizing circuit under the control of the output of said peak detector.

2. An automatic equalizer for a digital transmission system, which comprises, an equalizing network connected to receive incoming pulses and having a transfer characteristic with substantially flat loss, a fixed pole and at least one variable zero, and an amplifier connected to receive the output of said equalizing network and having a transfer characteristic with substantially flat gain and a fixed zero substantially coinciding in frequency with and canceling the fixed pole of said equalizing network, a peak detector connected to receive the output of said amplifier to generate an output proportional to the peak amplitude of said equalizing network, and means to vary both the magnitude of the flat gain and the frequency of the variable zero of said equalizing network under the control of the output of said peak detector.

3. An automatic equalizer in accordance with claim 2 in which the frequency of the variable zero of said equalizing network is variable upward from the frequency of the fixed pole of said equalizing network.

4. An automatic equalizer in accordance with claim 3 in which said amplifier is a differential amplifier with a pair of inputs and in which the output of said equalizing network is supplied to one of said inputs and the fixed pole is determined by a feedback path from the amplifier output to the other of said inputs.

5. An automatic equalizer in accordance with claim 3 in which said equalizing network comprises a two port network with a series resistor connecting one terminal of one port to one terminal of a second port and a shunt circuit shunting both ports said shunt path comprising a variable resistance in series with the parallel combination of a resistance and a capacitance and in which said variable resistance is controlled by the output of said peak detector.

6. An automatic equalizer in accordance with claim 5 in which said variable resistance is a current-sensitive variable resistance.

7. An automatic equalizer in accordance with claim 5 in which said variable resistance comprises at least one semiconductor diode.

UNITED STATES PATENT OFFICE
CERTIFICATE OF CORRECTION

Patent No. 3,568,100 Dated March 2, 1971

Inventor(s) Richard A. Tarbox

It is certified that error appears in the above-identified patent and that said Letters Patent are hereby corrected as shown below:

On the Title Page, inventor's name at line [72] should read as follows:

Richard A. Tarbox

Signed and sealed this 22nd day of June 1971.

(SEAL)
Attest:

EDWARD M.FLETCHER,JR.
Attesting Officer

WILLIAM E. SCHUYLER, JR.
Commissioner of Patents